Jan. 27, 1970          G. B. PAXTON          3,492,010
                        SEAL ASSEMBLY
                      Filed Jan. 15, 1968

INVENTOR.
BY George B. Paxton
George A. Schmidt
ATTORNEY

United States Patent Office 3,492,010
Patented Jan. 27, 1970

3,492,010
SEAL ASSEMBLY
George B. Paxton, 6210 Cowles Mount Blvd.,
La Mesa, Calif. 92041
Filed Jan. 15, 1968, Ser. No. 697,686
Int. Cl. F16j *15/00, 9/06;* F16k *41/00*
U.S. Cl. 277—143                              10 Claims

ABSTRACT OF THE DISCLOSURE

There is provided an improvement in shaft seal assemblies of the type utilized with rotating and/or reciprocating shafts and wherein a seal assembly is mounted in a machine part and surrounds a shaft rotating in the machine. The improvement includes a shaft seal assembly comprising a housing mountable in an opening in the machine part surrounding the shaft, such housing having at its inward termination an annularly angularly formed flange against which is disposed a seal ring of generally wedge shape and having an axial shaft engaging surface. The seal ring is provided with an inclined surface to engage the angular flange on the housing. A combination seal retainer and spring member is secured in the housing and engages the seal element, the member applying an axial biasing force to the seal element, forcing the element toward the housing and thus into engagement with the shaft, by means of the engagement of the inclined surfaces of the seal element and the angular flange on the housing.

---

Figure 1:
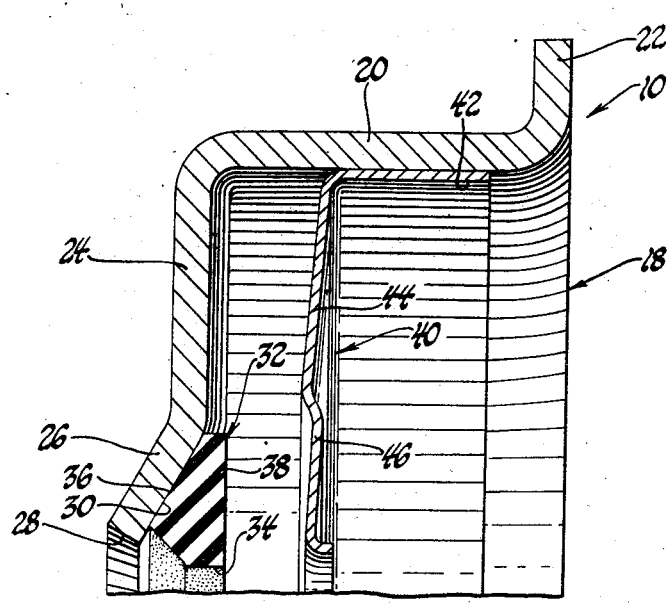

This invention relates to rotary and/or reciprocating shaft seal assemblies, and more particularly to a seal assembly having an element moveable axially under load into sealing engagement with a shaft.

In the design and manufacture of many machine parts it is necessary to provide a rotating or reciprocating shaft with a seal assembly in order to prevent fluid flow along the shaft in the particular installation involved. For example, a water pump shaft is mounted in a housing and the shaft must be sealed in order to prevent water flow along the shaft instead of in the pumping direction. Although there have been numerous types, styles and kinds of shaft seal assemblies utilized in the past, most of these have been complicated and cumbersome affairs because of design limitations, either in the structure of the seal element or in the structure of the supporting housing members. Many of the problems with generally available seal assemblies have been due to commonly used materials which were thought to be necessary in the sealing industry. Most of the presently available seals utilize elastomeric materials which present inherent problems. For example, many of the elastomers are incompatible with standard lubricants used in the machine parts, complicated by the fact that many of these elastomers are unable to operate under non-lubricated or dry conditions. Temperatures greatly effect the elastomeric materials; for example, there is rapid deterioration of elastomers at high operating temperatures and they tend to become brittle at low temperatures. In order to satisfy these kinds of problems, the sealing structures have become unnecessarily complicated and cumbersome to manufacture and use.

One typical seal assembly that is often used is a lip type seal of elastomeric material in which a garter spring is provided to maintain the seal element in contact with the shaft. By the use of such a garter spring, there is a relatively small contact area at each coil of the spring and the unit pressure on the sealing element or lip is very high. As a result, the coils quite often become embedded in the seal material. As loads change on the garter spring, due to dynamic eccentricities or shaft runout, the distance between spring coils changes and under high frequency load oscillations the spring has a tendency to chew its way through a thin section of seal material. Further, fluid at relatively high pressure tends to distort the seal element and apply a destructive load on the sealing lip area. This leads to leakage past the seal element, and thus the seal is ineffective.

The device in which this invention is embodied comprises, generally, a seal assembly utilizing a housing adapted to be secured in a machine part and surrounding a shaft, the housing having an inward annularly angular flange adjacent the shaft. A wedge shaped seal member is provided with an inclined surface, inclined at substantially the same angle as that of the angular flange on the housing, and the seal element has a shaft engaging surface for sealing against the shaft. Received and retained in the housing is a combination seal retainer and washer type spring member having an annularly angular flange which engages a relatively flat surface on the sealing element. When the member is mounted in the housing and against the seal element it biases the element toward the angular flange on the housing and tends to move the seal element axially of the shaft and into tight sealing engagement with the shaft.

Such a seal assembly satisfies the basic conditions necessary to proper seal function and operation. The seal element may be made of a flurocarbon material in a thin ring, thus satisfying elements of flexibility and economy. Concentricity between the seal element and the shaft is maintained by the ability of the seal element to move laterally in the housing, and thus along the inclined surface of the housing flange. Seal contact areas are well defined and controlled, because of the relatively simple shape and small cross-sectional area of the seal element. The combination seal retainer and spring member provides a continuous controlled load on the seal element at all sealing areas, by virtue of the wedge shape of the seal element and the contact between the inclined surface thereof and the angular flange on the housing member. The washer type spring member affords a continuous and relatively large contact area between the spring and the seal element, resulting in low unit pressure and minimum embedding of the spring in the seal material. Further, the seal assembly can withstand high fluid pressure without distortion or destructive load at the sealing engagement.

Figure 2:
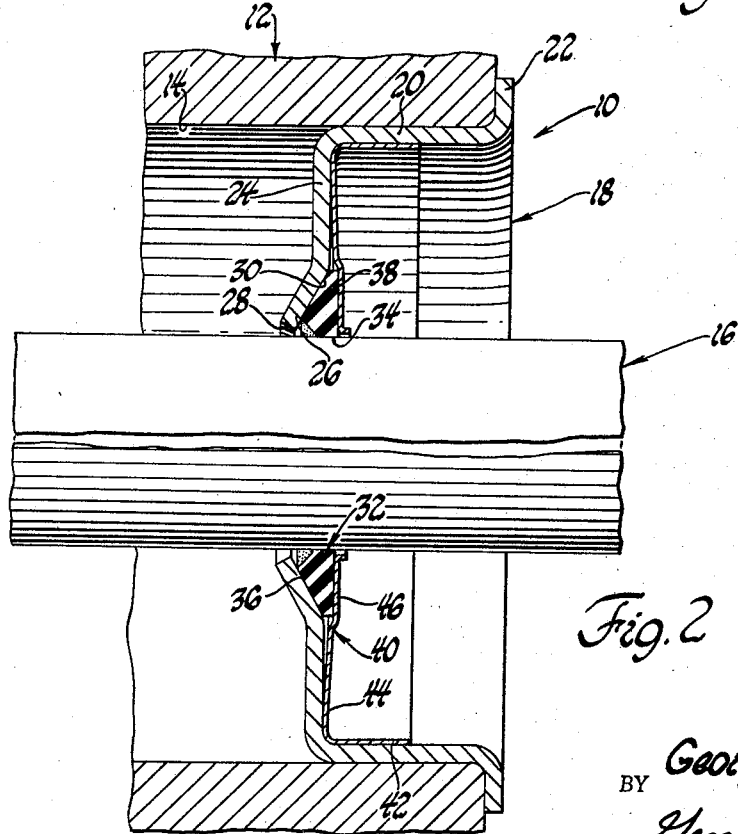

These and other advantages will become apparent from the following description used to illustrate a preferred embodiment of the invention when taken with the accompanying drawings in which:

FIGURE 1 is a partial cross-sectional view of a seal assembly embodying the present invention, showing the disposition of the various parts prior to assembly; and FIGURE 2 is a cross-sectional view of the seal assembly illustrated in FIGURE 1, showing the various parts assembled and mounted in a typical installation.

Referring more particularly to the drawings, where the showings are for the purpose of illustrating a preferred embodiment of the invention only, and not for purposes of limiting same, FIGURES 1 and 2 show a seal assembly, indicated generally by the numeral 10, mounted in a machine part or the like 12 having an opening 14 formed therein, and through which extends a shaft 16. It will be readily apparent that such a machine structure is a common occurrence and has no importance to the present invention.

Seal assembly 10 includes a housing, indicated generally by the numeral 18, which includes an axially disposed portion 20 receivable in the opening 14 in the machine part 12. Portion 20 terminates outwardly in a lip flange 22 which serves to locate the housing 18, and thus the seal assembly 10, relative to the machine part 12. Extending radially inwardly from the axial portion 20 is a web 24 which is disposed generally normal to the axis of the shaft 16. Inwardly of the web portion 24 is an annularly angularly inclined flange 26, terminating in an opening 28 through which extends the shaft 16. Flange 26 includes an inclined surface 30, the purpose for which will become hereinafter more apparent.

The sealing element, indicated generally by the numeral 32, is generally wedge shaped, as indicated in the drawings, having a shaft engaging surface 34 adapted to engage the shaft 16 in sealing engagement, as will become hereinafter more apparent. Element 32 has an inclined surface 36 which engages the inclined surface 30 on the housing flange 26, and is at substantially the same angle as the surface 30 on the housing flange 26. The opposite surface 38 of the seal element 32 is generally normal to the axis of the shaft 16. Element 32 may be formed of any of a variety of materials, although it is preferred that it be of a fluorocarbon material, such as Teflon, to name only one. It has been found that Teflon satisfies more of the basic parameters required in seal construction and use, and at the same time eliminates some of the inherent problems of elastomeric materials when used as rotary and/or reciprocating shaft seals.

In order to retain the seal element 32 in position on the shaft 16 and against the housing 18, a combination seal retainer and spring washer member, indicated generally by the numeral 40, is provided. Member 40 includes an axially extending flange 42 at its outer periphery, whereby it may be secured to the housing 18 in any suitable manner. A web portion 44 extends inwardly from the flange 42 and in its free position is disposed at an angle inwardly toward the seal element 32. At the inner extremity of the web portion 44 is an annular portion 46 which, in its free position, is disposed at an inward angle somewhat less than that of web portion 44.

When the combination seal retainer and spring washer member 40 is completely mounted in the housing 18, the inner portion 46 engages the vertical surface 38 of the seal element 32 and the web 44 is angularly displaced from the adjacent surface of the housing web 24, in the manner illustrated in FIGURE 2. A force is thus applied to bias the seal element 32 toward the angular flange 26 of the housing 18. It will be apparent that such biasing force tends to move the seal element 32 in an axial direction, toward the left as viewed in FIGURE 2, and thus drives the seal element into sealing engagement with the shaft 16.

The extent of axial movement of the seal retainer and spring washer member 40 is limited by the complete surface engagement of the web portion 24, thereby limiting the load applied to seal element 32 by pressure of fluid being sealed to a product of fluid pressure and the relatively small area of contact between the flange 46 and the seal element 32. The resulting force applies a continuous controlled load on the seal element 32 to maintain the seal element in engagement with the angular flange 26 of the housing 18. The axial load caused by the spring member 40 is implemented by the pressure of the fluid being sealed, which would be located to the right as viewed in FIGURE 2. The greater the fluid pressure against the spring member 40 and the seal element 32, the greater is the tendency toward axial displacement and movement along the inclined surfaces 30 and 36 to secure sealing engagement with the surface of shaft 16. The magnitude of the axial load on the seal element is a function of wedge angle, the thickness of the material in the spring member 40, the degree of deflection of the spring member 40, the effective beam length of the spring member 40 and the fluid pressure on the pressure side of the structure. Such component factors can be varied and optimized to satisfy variables encountered, such as shaft size, shaft speed and eccentricity.

Thus, a seal assembly is provided which readily meets basic design conditions required of seal assemblies and which is extremely simple, economical to manufacture and produce, and is easily mounted in an installation. The wedge shaped design and the constant axial spring pressure maintain the seal in sealing engagement with the shaft surface, thus creating a more efficient seal under all conditions of operation.

The present invention has been described in connection with certain structural embodiments; however, it is to be appreciated that various changes may be made in the structural embodiments without departing from the intended spirit and scope of the present invention.

Having thus described the invention, I claim:

1. A shaft seal assembly comprising:
   a housing;
   a seal member engaging said housing and having a shaft engaging surface;
   spring means secured in said housing and engaging said seal member for applying a force on said seal member in a direction generally parallel to said shaft engaging surface; and
   means on said seal member and said housing for directing said seal member in shaft engaging direction in response to the force from said spring means.

2. The shaft seal assembly set forth in claim 1 wherein said last named means includes an annularly inclined surface on said seal member and an annularly inclined surface on said housing, said surfaces being inclined inwardly in the direction of the axial force applied by said spring means.

3. The shaft seal assembly set forth in claim 1 and further including means for limiting the movement of said spring means in said direction generally parallel to said shaft engaging surface.

4. A shaft seal assembly receivable in a machine and surrounding a shaft and comprising:
   a housing receivable in said machine and having an annularly angular seal engaging surface adjacent said shaft;
   a seal member having a shaft engaging sealing surface and an annularly angular surface engaging said surface on said housing; and
   spring means secured in said housing and engaging said seal member for applying a generally axial force on said seal member to bias said seal member against said housing surface and into sealing engagement with said shaft.

5. The seal assembly set forth in claim 4 and further including means for limiting the application of axial force by said spring means.

6. A shaft seal assembly mounted in a machine and around a shaft and comprising:
   a housing received in an opening in said machine and having an annular portion extending toward said shaft, said housing having an angularly inclined surface adjacent said shaft;
   an annular seal element having a shaft engaging surface and an inclined surface engaging said inclined surface on said housing, said seal element having a generally radial surface on the side thereof opposite from said inclined surface; and
   a spring member secured in said housing and having an annular spring portion engaging said generally radial surface on said seal element and biasing said seal element toward said inclined surface on said housing and into sealing engagement with said shaft.

7. The seal assembly set forth in claim 6 and further including means for limiting the biasing force of said spring member against said seal element.

8. A shaft seal adapted to be mounted in a machine and surrounding a shaft and comprising:
   an annular housing receivable in an opening in said machine, said housing having an inclined seal engaging surface adjacent said shaft;
   an annular seal member having an axial shaft engaging surface and an annular inclined surface engaging said inclined surface on said housing;
   and an annular spring member received in said housing and having an annular portion engaging said seal member and biasing said seal member against said inclined surface on said housing.

9. The shaft seal assembly set forth in claim 8 wherein said spring member is angularly disposed relative to said housing such that axial movement thereof in biasing said seal member against said inclined surface on said housing decreases the angular disposition of said spring member relative to said housing.

10. A shaft seal assembly comprising:
   a housing having an axial outer flange engageable with a machine and a radial web extending inwardly from said flange, said web terminating in an annularly angular portion adjacent a shaft rotating in said housing;
   a seal member having a shaft engaging portion and an annularly angular surface engaging said angular portion of said housing;
   a spring member having an outer axial flange secured to said flange on said housing and a web portion extending radially inwardly adjacent said web portion on said housing, said web portion of said spring member being angularly disposed relative to said web portion of said housing such that the inner portion thereof is more distant from said housing that the outer portion thereof;
   and a flange on said spring member extending angularly inwardly from said web portion, said flange engaging said seal member and biasing said seal member in an axial direction toward said inclined portion of said housing, said inclined portion of said housing directing said seal member into sealing engagement with said shaft, and said web portion on said spring member engaging said web portion on said housing upon the application of a predetermined fluid pressure.

References Cited

UNITED STATES PATENTS

| | | | |
|---|---|---|---|
| 2,005,446 | 6/1935 | Winter | 277—48 |
| 3,061,320 | 10/1962 | Haensch | 277—84 |
| 3,367,666 | 2/1968 | Symons | 277—40 |

LOUIS K. RIMRODT, Primary Examiner

U.S. Cl. X.R.

277—40